US012699010B2

(12) United States Patent
Matheret et al.

(10) Patent No.: US 12,699,010 B2
(45) Date of Patent: Aug. 4, 2026

(54) TEMPERATURE SENSOR AND CIRCUIT

(71) Applicant: Melexis Technologies SA, Bevaix (CH)

(72) Inventors: Titouan Matheret, Bevaix (CH);
Carlos Velasquez, Bevaix (CH);
Arnaud Laville, Bevaix (CH);
Bertrand Coulon, Bevaix (CH)

(73) Assignee: MELEXIS TECHNOLOGIES SA,
Bevaix (CH)

( * ) Notice: Subject to any disclaimer, the term of this
patent is extended or adjusted under 35
U.S.C. 154(b) by 376 days.

(21) Appl. No.: 18/499,782

(22) Filed: Nov. 1, 2023

(65) Prior Publication Data

US 2024/0151593 A1     May 9, 2024

(30) Foreign Application Priority Data

Nov. 4, 2022     (EP) .................................... 22205623

(51) Int. Cl.
*G01K 7/34* (2006.01)

(52) U.S. Cl.
CPC ........... *G01K 7/34* (2013.01); *G01K 2219/00*
(2013.01)

(58) Field of Classification Search
CPC ........ G01K 7/01; G01K 2219/00; G01K 7/00;
G01K 7/34; H03K 17/687; H03K 17/56;
H03K 17/51; H03K 2017/0806; H03K
17/08; H03K 17/00
See application file for complete search history.

(56) References Cited

U.S. PATENT DOCUMENTS

| | | | | | |
|---|---|---|---|---|---|
| 10,260,957 B2 | * | 4/2019 | Ma | ........................... | G01K 3/04 |
| 10,317,293 B2 | | 6/2019 | Vaiana et al. | | |
| 10,468,974 B2 | * | 11/2019 | Lee | .................. | H03K 17/04206 |
| 10,515,705 B1 | | 12/2019 | Tang et al. | | |
| 10,656,023 B2 | * | 5/2020 | Kim | ........................... | G05F 3/26 |
| 11,519,790 B2 | | 12/2022 | Nomiya et al. | | |
| 2015/0355033 A1 | | 12/2015 | Zhang et al. | | |

(Continued)

FOREIGN PATENT DOCUMENTS

| | | |
|---|---|---|
| CN | 106017710 A | 10/2016 |
| CN | 106461470 A | 2/2017 |

(Continued)

OTHER PUBLICATIONS

Pertijs et al., "A CMOS Smart Temperature Sensor With a 3σ
Inaccuracy of ±0.5 °C From =50 °C to 120 °C", IEEE Journal of
Solid-State Circuits, Feb. 1, 2005, pp. 454-461, vol. 40, No. 2.

(Continued)

*Primary Examiner* — Diana J. Cheng
(74) *Attorney, Agent, or Firm* — Workman Nydegger

(57) ABSTRACT

A temperature sensor comprising at least one temperature
sensing circuit. Each temperature sensing circuit comprise a
series connection of a first connecting node, a first capacitor
connected to a first reset transistor for biasing the first
capacitor to a first bias voltage, a bias transistor for distrib-
uting charges between the first and second capacitor after
biasing the first and second capacitor, a second capacitor
connected to a second reset transistor for biasing the second
capacitor to a second bias voltage, a second connecting
node. Each temperature sensing circuit comprises at least
one voltage readout node between the first capacitor and the
second capacitor.

15 Claims, 14 Drawing Sheets

(56) References Cited

U.S. PATENT DOCUMENTS

2019/0157970 A1      5/2019  Lee et al.
2019/0353534 A1 *  11/2019  Mordakhay ............ G01K 7/226

FOREIGN PATENT DOCUMENTS

CN          110830000  A      2/2020
CN          111751029  A    10/2020

OTHER PUBLICATIONS

Extended European Search Report from Corresponding European
Patent Application No. EP22205623.6, Apr. 28, 2023.
Chinese Office Action from Corresponding Chinese Patent Appli-
cation No. CN202311460203.4, Apr. 11, 2026.

* cited by examiner

TEMPERATURE SENSOR AND CIRCUIT

FIELD OF THE INVENTION

The invention relates to the field of temperature sensors. More specifically it relates to a temperature sensor circuit which can be integrated on an integrated circuit.

BACKGROUND OF THE INVENTION

In many applications, integrated circuits (ICs) require an embedded temperature sensor, for example for calibration of a sensor signal.

A prior art integrated temperature sensor circuit may for example comprise a resistor bridge wherein the resistors are made of different materials.

The linearity of such a resistive temperature sensor may for example deteriorate for temperatures below 0° C. In view of the different temperature sensitivity at different temperatures, such sensors typically also need to be calibrated on at least three different temperatures.

When operating a resistive temperature sensor a current needs to be applied through the resistors. This results in a significant power consumption which preferably is decreased.

There is a need for integrated temperature sensors for which at least one of the temperature sensor characteristics is improved. An improved temperature sensor may for example have an improved accuracy, and/or an improved linearity, and/or a lower power consumption with respect to the state-of-the-art.

SUMMARY OF THE INVENTION

It is an object of embodiments of the present invention to provide a good temperature sensor which can be integrated on an integrated circuit.

The above objective is accomplished by a method and device according to the present invention.

In a first aspect embodiments of the present invention relate to a temperature sensor. The temperature sensor comprising at least one temperature sensing circuit. Each temperature sensing circuit comprises a series connection of a first connecting node, a first capacitor connected to a first reset transistor for biasing the first capacitor to a first bias voltage, a bias transistor for distributing charges between the first and second capacitor after biasing the first and second capacitor, a second capacitor connected to a second reset transistor for biasing the second capacitor to a second bias voltage, a second connecting node.

Each temperature sensing circuit comprises at least one voltage readout node between the first capacitor and the second capacitor.

It is an advantage of embodiments of the present invention that a voltage at the at least one readout node can be obtained that has a linear dependance on the temperature.

In embodiments of the present invention the temperature sensor comprises two temperature sensing circuits wherein a ratio of a capacitance of the first capacitor and a capacitance of the second capacitor is different for the two sensing circuits.

In embodiments of the present invention the bias transistor of one of the temperature sensing circuits is a n-channel metal-oxide-semiconductor transistor and the bias transistor of another of the temperature sensing circuits is a p-channel metal-oxide-semiconductor transistor.

In embodiments of the present invention the temperature sensor comprises a voltage reference circuit for obtaining a predefined bias voltage for biasing the bias transistor.

In embodiments of the present invention the temperature sensor comprising a divider for dividing a voltage at the first connecting node for obtaining a predefined bias voltage for biasing the bias transistor.

In embodiments of the present invention each temperature sensing circuit comprises an inject switch between the first capacitor and the bias transistor or between the bias transistor and the second capacitor. The inject switch can be opened for distributing the charges, or closed when biasing the first or second capacitor.

In embodiments of the present invention the first reset transistor of each temperature sensing circuit is a p-channel metal-oxide-semiconductor transistor.

In embodiments of the present invention the first reset transistor is connected in parallel with the first capacitor.

In embodiments of the present invention the second reset transistor of each temperature sensing circuit is a n-channel metal-oxide-semiconductor transistor.

In embodiments of the present invention the second reset transistor is connected in parallel with the second capacitor.

In embodiments of the present invention the bias transistor of each temperature sensing circuit is a n-channel metal-oxide-semiconductor transistor.

In embodiments of the present invention the bias transistor of each temperature sensing circuit is a p-channel metal-oxide-semiconductor transistor.

In embodiments of the present invention the temperature sensor comprises a controller configured for executing process steps for controlling each temperature sensing circuit. The process steps comprising:

interrupting a conductive path between the first and the second capacitor, controlling the first reset transistor for biasing the first capacitor to the first bias voltage and the second reset transistor for biasing the second capacitor to the second bias voltage, closing the conductive path between the first and the second capacitor for distributing charges between the first and second capacitor after biasing the first and second capacitor, reading a voltage from the voltage readout node.

In embodiments of the present invention the temperature sensor comprises an analog to digital converter for digitizing the obtained output voltage and a controller configured for converting the digitized output voltage in a temperature using a conversion scheme.

In embodiments of the present invention the controller is configured for obtaining the conversion scheme using a one point calibration.

In embodiments of the present invention the controller is configured for obtaining the conversion scheme using a two point calibration.

In embodiments of the present invention the capacitance of the first capacitor and of the second capacitor is ranging 20 fF and 2000 fF.

In a second aspect embodiments of the present invention relate to a method for controlling a temperature sensor according to embodiments of the present invention. The method comprises:

interrupting a conductive path between the first and the second capacitor, controlling the first reset transistor for biasing the first capacitor to the first bias voltage and the second reset transistor for biasing the second capacitor to the second bias voltage, closing the conductive path between the first and the second capacitor for distributing charges between the first and second capacitor after biasing the first and second capacitor reading a voltage from the voltage readout node.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
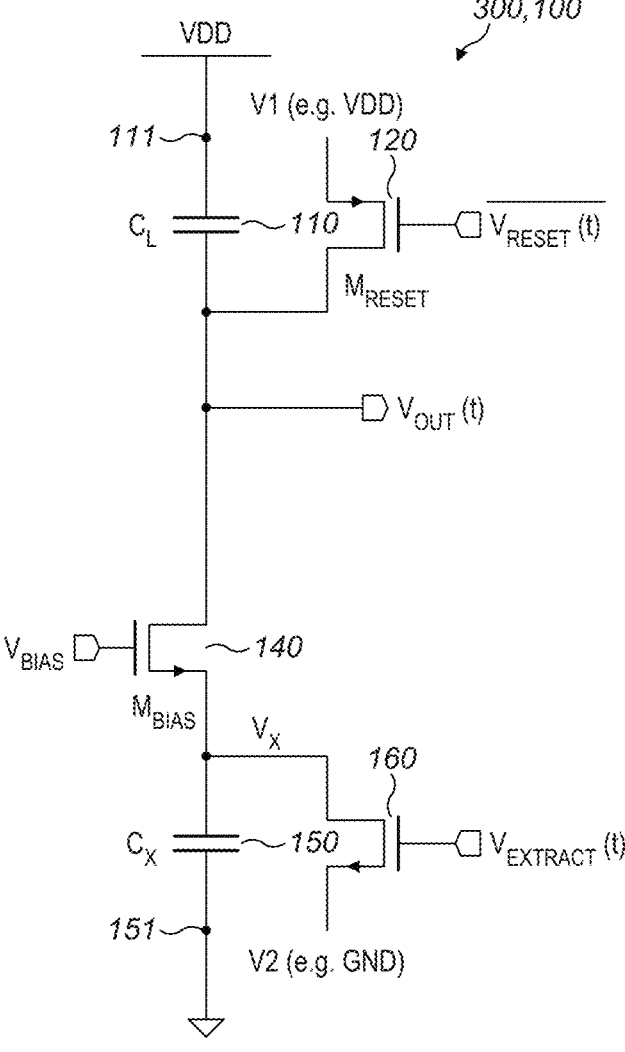
FIG. 1 shows a drawing of a temperature sensing circuit in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a temperature sensor based on switched capacitors. In a preferred embodiment an integrated differential switched capacitor temperatures sensor is proposed.

A temperature sensor 300 according to embodiments of the present invention comprises at least one temperature sensing circuit 100. An exemplary embodiment of such a temperature circuit is shown in FIG. 1. It comprises a series connection of a first connecting node 111 in series with a first capacitor 110, a bias transistor 140, a second capacitor 150, and a second connecting node 151. The temperature sensing circuit is connectable between a first voltage at the first connecting node and a second voltage at the second connecting node. This may be regulated voltages or voltages obtained using one or more resistive dividers. Temperature sensing circuit may be connected between the supply rails. In that case, the temperature sensing circuit is connectable between a supply voltage VDD at the first connecting node and ground at the second connecting node. An advantage thereof is that the voltage difference between node 111 and 151 is maximal and the sensitivity of the temperature sensor circuit is maximal as well. The first and second voltage may be symmetric relative to the supply nodes, but this is not strictly required.

The first capacitor 110 is connected to a first reset transistor 120 for biasing the first capacitor to a first bias voltage. In the example of FIG. 1 the first bias voltage is the voltage V1. This voltage may for example be 90% of the supply voltage VDD, or 99% of the supply voltage VDD, or the supply voltage VDD.

The second capacitor 150 is connected to a second reset transistor 160 for biasing the second capacitor 150 to a second bias voltage. In the example of FIG. 1 the first bias voltage is the voltage V2. This voltage may for example be 1% of the supply voltage VDD, or 10% of the supply voltage VDD, or the ground voltage GND.

The first and second bias voltage may be obtained using a circuit such as a resistive divider or regulated voltage, or charge-pump. The two capacitors do not strictly need to be biased at the same nominal voltage. One could for example be shortened and the other biased to a charge different from zero.

By controlling the gate of the bias transistor 140 either the bias transistor can be switched off, during which the first and second capacitor can be biased, either the bias transistor can be opened for distributing charges between the first and second capacitor. The charge distribution can be controlled by the gate. In embodiments of the present invention the gate of the bias transistor is biased with a bias voltage for distributing charges between the first and second capacitor. This bias voltage may be a predetermined bias voltage.

In embodiments of the present invention the transistor has a characteristic which is temperature dependent. In particular the threshold voltage of the bias transistor Vt is temperature dependent.

In embodiments of the present invention each temperature sensing circuit comprises at least one voltage readout node between the first capacitor 110 and the second capacitor 150.

In embodiments of the present invention this may for example be the node $V_{out}(t)$ between the first capacitor 110 and the bias transistor 140. Alternatively it may be the node $V_x$ between the bias transistor 140 and the second capacitor 150, or any other node between the first and second capacitor.

In the exemplary embodiment illustrated in FIG. 1 the bias transistor 140 is a nMOS transistor. The bias transistor is controlled at its gate using a bias voltage $V_{BIAS}$.

In FIG. 1 the first reset transistor is a PMOS transistor with its source connected to a supply voltage $V_1$ (e.g. VDD) and its drain connected to a second terminal of the first capacitor wherein the first terminal is connected to VDD. The gate of the first reset transistor is controlled by control signal $V_{RESET}$.

In FIG. 1 the second reset transistor is a NMOS transistor with its source connected to a supply voltage $V_2$ (e.g. GND) and its drain connected to a first terminal of the second capacitor wherein the second terminal is connected to GND. The gate of the second reset transistor is controlled by control signal $V_{EXTRACT}$.

In embodiments of the present invention the output voltage at the voltage readout node may be obtained with respect to ground. This is, however, not strictly required. It may also be obtained with respect to the output voltage of the voltage readout node of a second temperature sensing circuit.

In embodiments of the present invention the output voltage at the voltage readout node may be obtained after it has reached a stable value. This may be a predefined period of time after applying a bias voltage on the gate of the bias transistor which may for example be in the microsecond range.

Figure 2:
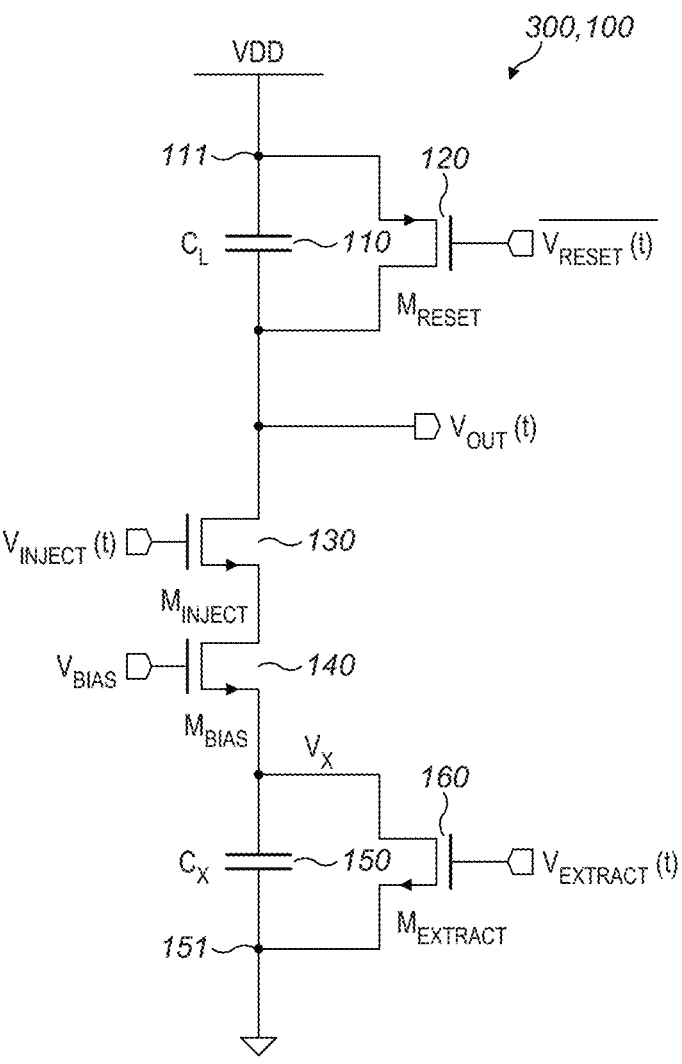
FIG. 2 shows a drawing of a temperature sensing circuit, additionally comprising an inject switch, in accordance with embodiments of the present invention.

In embodiments of the present invention each temperature sensing circuit 100 comprises an inject switch 130 between the first capacitor 110 and the bias transistor 140 or between the bias transistor 140 and the second capacitor 150. The inject switch 130 can be opened for distributing the charges, or closed when biasing the first or second capacitor. An example of such a temperature sensing circuit is illustrated in FIG. 2. In comparison with FIG. 1, the temperature sensor circuit in FIG. 2 additionally comprises the inject switch. In this example the inject switch is a nMOS transistor. Its gate is controlled using inject signal $V_{INJECT}$. The inject switch is connected with its source to the drain of the bias transistor and with its drain to the second terminal of the first capacitor. The first reset transistor is connected in parallel with the first capacitor (with its source to VDD and with its drain to the second terminal of the first capacitor). The second reset transistor is connected in parallel with the second capacitor (with its source to GND and with its drain to the first terminal of the second capacitor). In this example the first and second capacitors may be biased at an initial voltage that is substantially zero. In other words, the initial charge is substantially zero.

It is noted that the inject switch is not mandatory. A single bias transistor may be used (i.e. operated as blocking or biased at Vbias).

In this exemplary embodiment of the present invention the voltage readout node corresponds with the second terminal of the first capacitor.

In a second aspect embodiments of the present invention relate to a method for controlling a temperature sensor 300 according to embodiments of the present invention. The method comprises:

interrupting a conductive path between the first and the second capacitor, controlling the first reset transistor for biasing the first
   capacitor to the first bias voltage and the second reset
   transistor for biasing the second capacitor to the second
   bias voltage,
closing the conductive path between the first and the
   second capacitor for distributing charges between the
   first and second capacitor after biasing the first and
   second capacitor,
reading a voltage from the voltage readout node.

In embodiments of the present invention the conductive
path between the first and the second capacitor should be
interrupted when biasing the first and second capacitor.
When the voltage readout node is at the second terminal of
the first capacitor, the voltage from the voltage readout node
can be read after the charges are distributed. Reading may be
done before or after interrupting the conductive path. It may
even be done after biasing the second capacitor.

In embodiments of the present invention interrupting and
closing the conductive path between the first and the second
capacitor may be achieved by controlling the gate of the
inject switch. If no inject switch is present it may be
achieved by controlling the gate of the bias transistor.

The temperature sensing circuit illustrated in FIG. 2 may
for example be controlled by:

Controlling the first reset transistor for biasing the first
capacitor by forcing the output voltage at the voltage readout
node to its initial state $V_{OUT}(t)=VDD$ using the control
signal $V_{RESET}(t)$.

Figure 3:
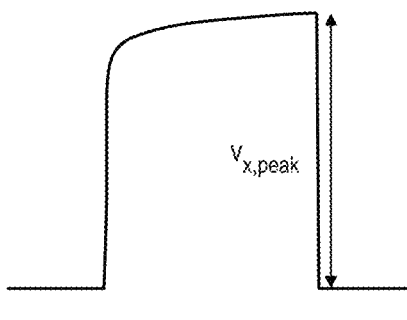
FIG. 3 shows a graph illustrating the output voltage in function of time of a temperature sensing circuit in accordance with embodiments of the present invention.

Closing the inject switch 130 (e.g. during a few micro-
seconds) using the control signal $V_{INTECT}(t)$ at its gate, while
biasing the bias transistor 140. As a result thereof charges
will re-distribute between the first and second capacitor
according to the following formula:

$$V_{OUT} = V_{DD} - \frac{Q_L}{C_L} = V_{DD} - \frac{C_X \cdot V_{X,peak}(T)}{C_L},$$

with $C_L$ the capacitance of the first capacitor and $C_X$ the
capacitance of the second capacitor, and $V_{X,peak}$ the stabi-
lized voltage at the voltage readout node after redistribution.
The output voltage in function of time is shown in FIG. 3.
It was found by the inventors that $V_{X,peak}$ varies substantially
linearly with temperature. In embodiments of the present
invention the stabilized voltage $V_{X,peak}$ is sampled by an
ADC.

Interrupting the conductive path between the first and
second capacitor. In the circuit illustrated in FIG. 2 this can
be achieved by opening the inject switch using the control
signal $V_{INJECT}(t)$. When this signal goes low the inject
switch is closed. The second reset transistor is closed when
the inject switch is open. As a result thereof the second
capacitor is discharged while $V_{OUT}(t)$ stays at the same
potential. Please note that this can also be bone at the start
of the cycle. For a valid measurement the first and second
capacitor need to be biased to the first and second bias
voltage before redistribution of the charges in step 2.

In embodiments of the present invention the process for
measuring the temperature is repeated every time a tem-
perature measurement is required. In between measurements
the temperature sensor is in standby mode and thus a low
energy consumption can be obtained.

Figure 4:
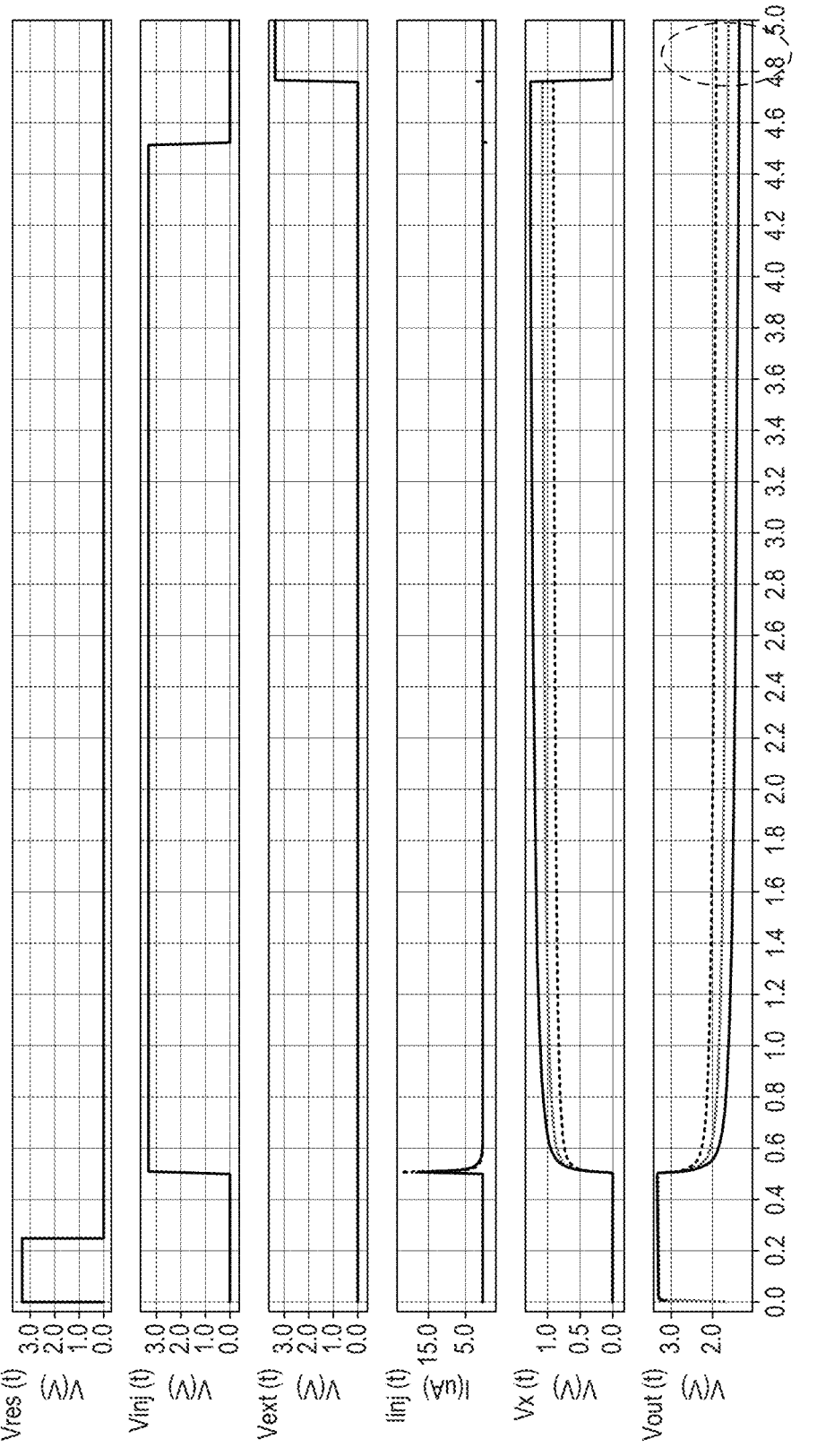
FIG. 4 shows different signals in function of time of a temperature sensing circuit in accordance with embodiments of the present invention.

FIG. 4 shows a number of signals in function of time
corresponding to operation of the circuit of FIG. 2. From top
to bottom the following signals are shown: the control signal
$V_{res}(t)$ of the first reset transistor, the control signal $V_{inj}(t)$ of the inject switch, the control signal $V_{ext}(t)$ of the second
reset transistor, the current $I_{inj}(t)$ through between the first
and second capacitor through the inject transistor, the volt-
age $V_x(t)$ on the first terminal of the second capacitor, and
the voltage $V_{out}(t)$ on the voltage readout node.

Note that $V_{res}(t)$ and $V_{ext}(t)$ are only high when $V_{inj}(t)$ is
low. Biasing of the first capacitor or the second capacitor is
only done when the inject switch is closed, or in more
general terms when the conductive path between the first
and the second capacitor is interrupted.

Figure 5:
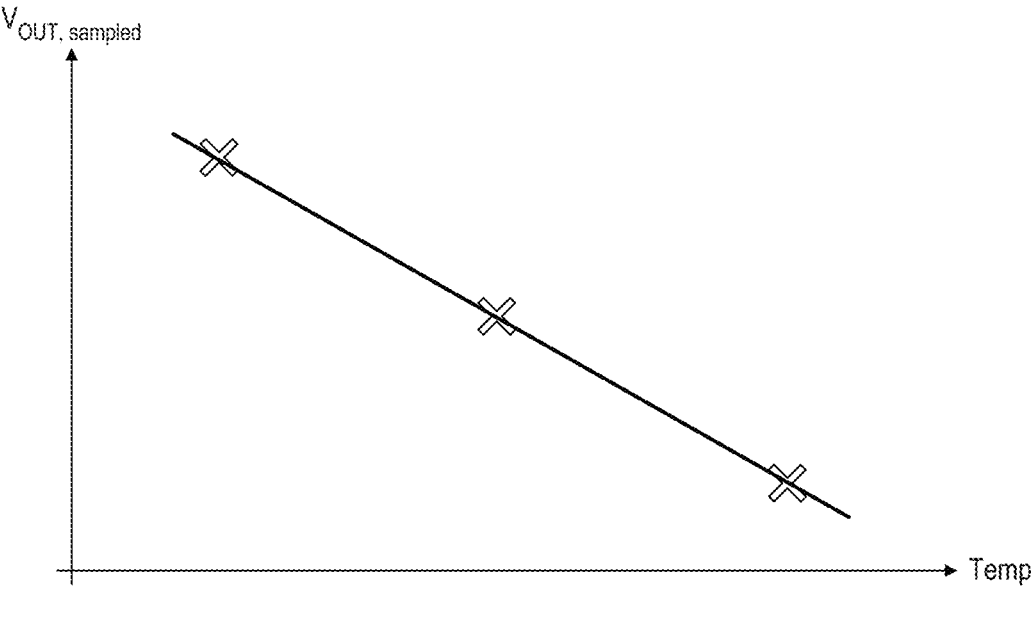
FIG. 5 shows steady state output voltages in function of temperature of a temperature sensing circuit in accordance with embodiments of the present invention.

In the bottom two graphs of FIG. 4 the curves are obtained
for different temperatures. It can be seen that the obtained
voltage is temperature dependent. The obtained steady state
voltages are shown in function of temperature in FIG. 5. The
linear relationship between the voltage on the voltage read-
out node and the temperature is clearly visible from FIG. 5.

Figure 6:
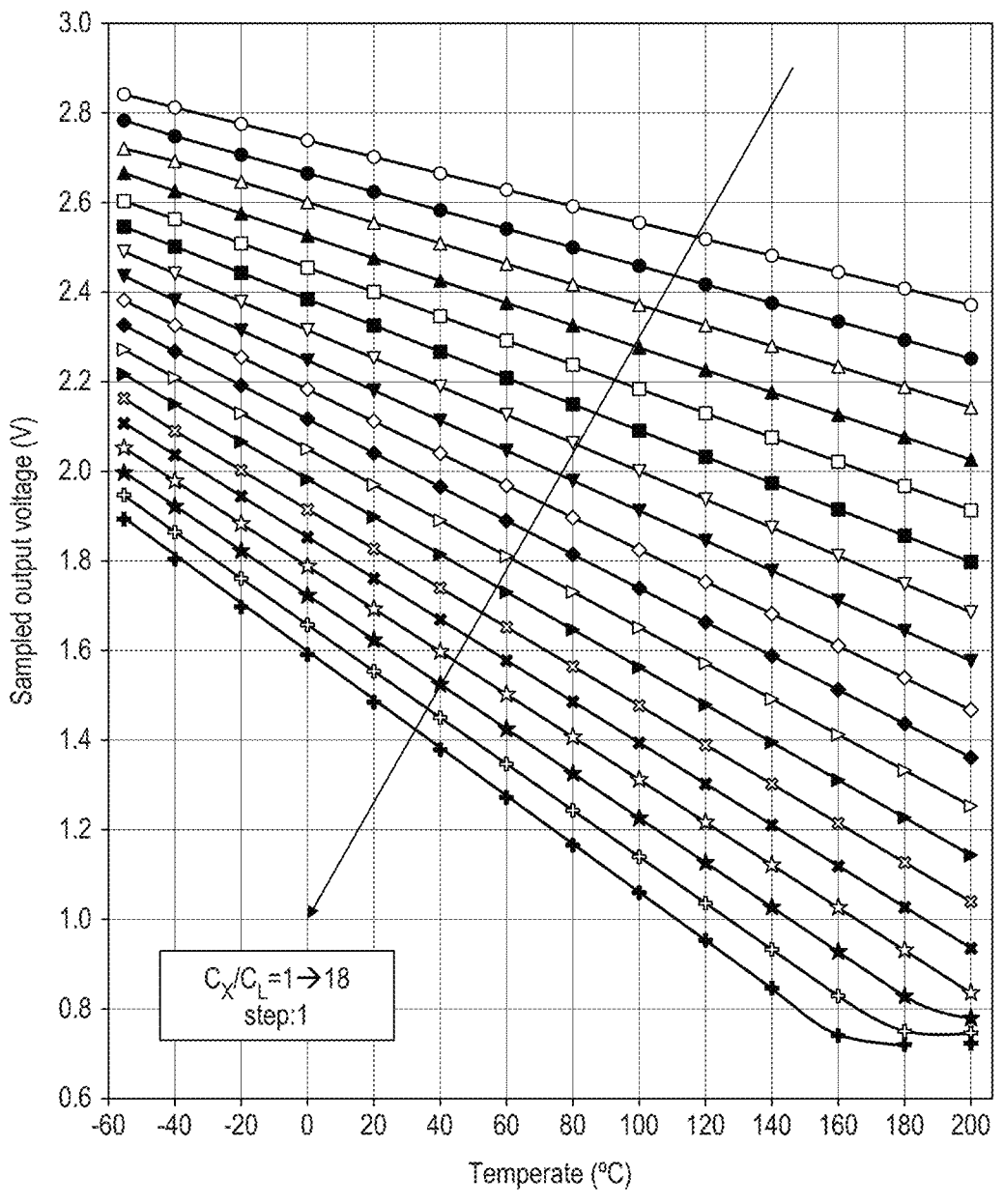
FIG. 6 shows the sampled output voltage in function of temperature of temperature sensing circuits having different capacity ratios, in accordance with embodiments of the present invention.

The ratio between the capacitances ($r=C_x/C_1$) of the
second and the first capacitor impacts the slope of the
characteristic. The slope increases with the ratio. Without
being bound by theory it is assumed that the reason for this
change in slope is that a different amount of charges are
required to be redistributed and hence to be transferred to
exit the saturation region of the transistor. The change of
slope is illustrated in FIG. 6. The $C_x/C_1$ value changes from
1 to 18 in the direction of the arrow.

A temperature sensor 300 according to embodiments of
the present invention may comprise two temperature sensing
circuits 100.

It is advantageous that in such a temperature sensor the
ratio of a capacitance of the first capacitor 110 and a
capacitance of the second capacitor 150 is different for the
two sensing circuits and/or that the bias transistor 140 of one
of the temperature sensing circuits is a n-channel metal-
oxide-semiconductor transistor and the bias transistor 140 of
another of the temperature sensing circuits 100 is a p-chan-
nel metal-oxide-semiconductor transistor. In the first case
the slope of the output voltage in function of temperature in
absolute value will be different for both temperature sensing
circuits, in the second case the slope will be different in sign
for both temperature sensing circuits. A differential voltage
can be obtained between the voltage readout nodes of both
temperature sensing circuits.

It is an advantage of embodiments of the present inven-
tion that the dependency of the output voltage at the voltage
readout node on the temperature is opposite for a tempera-
ture sensing circuit wherein the bias transistor is an nMOS
transistor compared to a temperature sensing circuit wherein
the bias transistor is a pMOS transistor. As a result thereof
an increased sensitivity to temperature of the differential
voltage difference between the output voltages of the two
temperature sensing circuits can be obtained.

Figure 7:
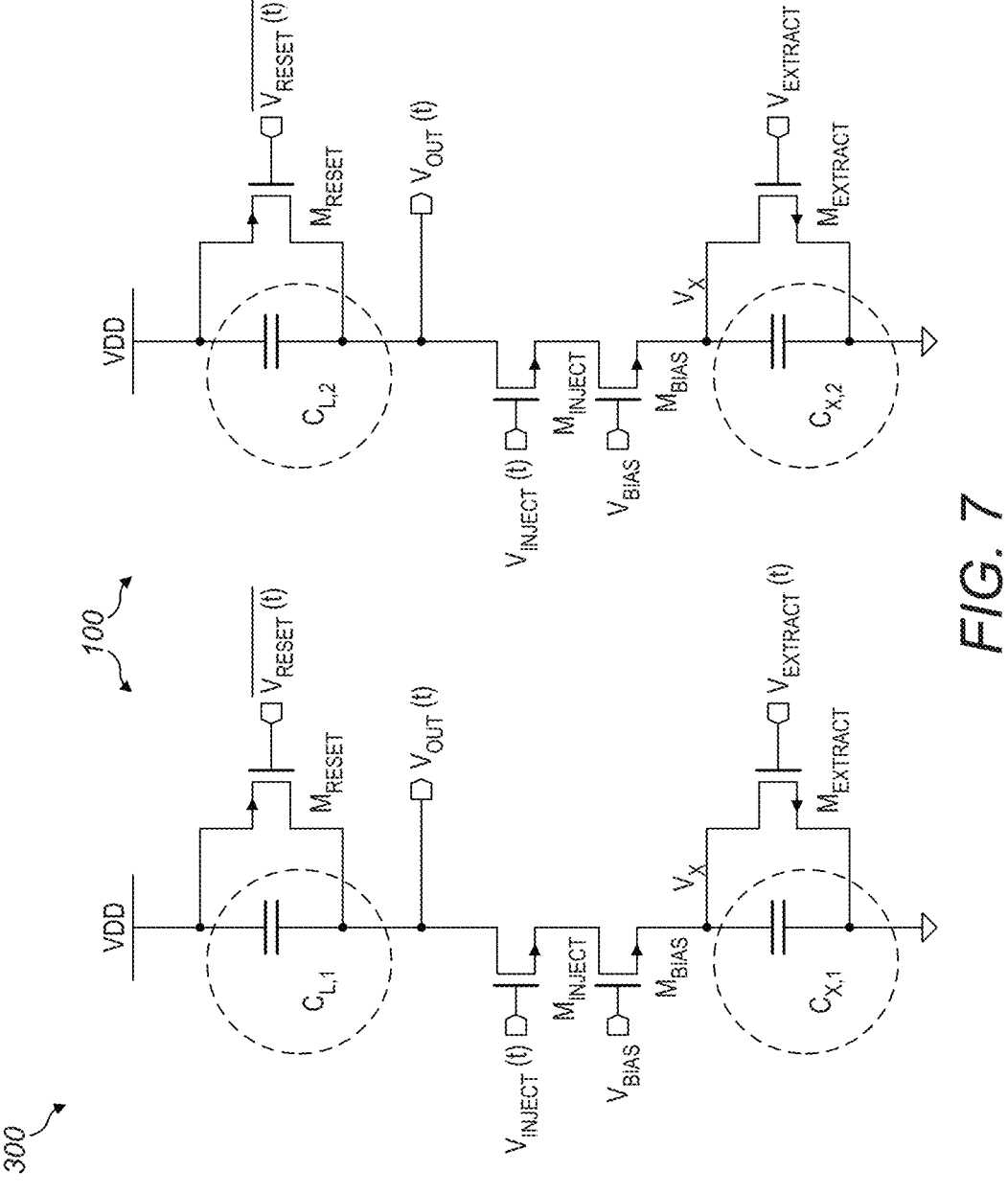
FIG. 7 shows an electronic schematic of a temperature sensor comprising a first and a second temperature sensing circuit, in accordance with embodiments of the present invention.
Figure 8:
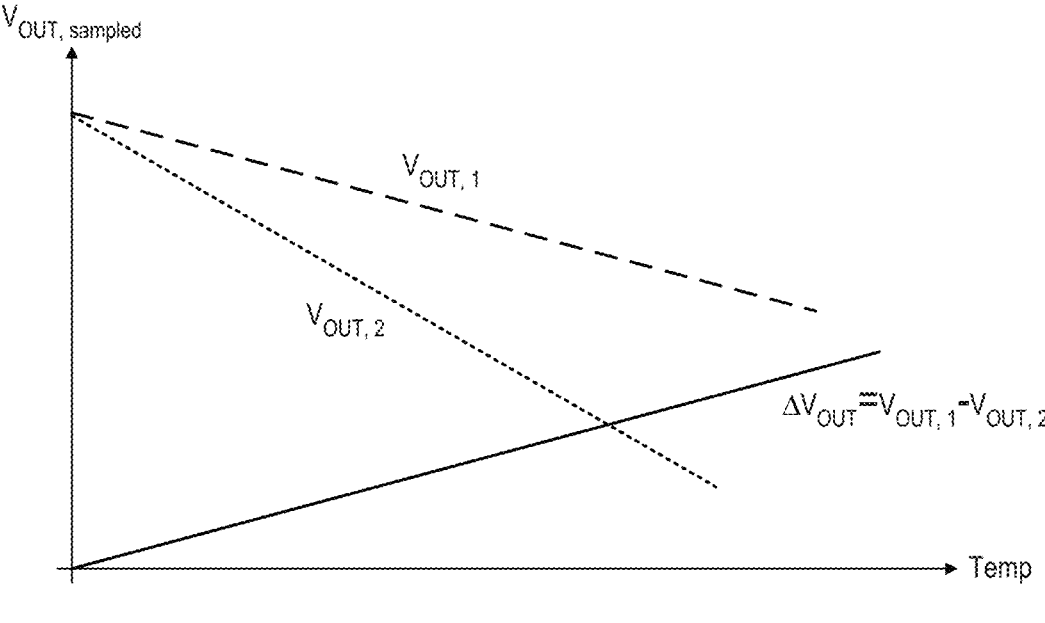
FIG. 8 shows output voltages in function of temperature of the temperature sensing circuits of FIG. 7.

FIG. 7 shows an electronic schematic of a temperature
sensor 300 comprising a first and a second temperature
sensing circuit 100, in accordance with embodiments of the
present invention. In this example $C_{x,1}/C_{L,1}<C_{x,2}/C_{L,2}$. FIG.
8 shows the output voltage $V_{out,1}$ in function of temperature
of the first temperature sensing circuit, the output voltage
$V_{out,2}$ in function of temperature of the second temperature
sensing circuit, and the difference between $V_{out,2}$ and $V_{out,1}$
($V_{out,1}-V_{out,1}$). By making the difference between both
output voltages an offset can be removed and the sensitivity
to temperature changes can be increased.

Figure 9:
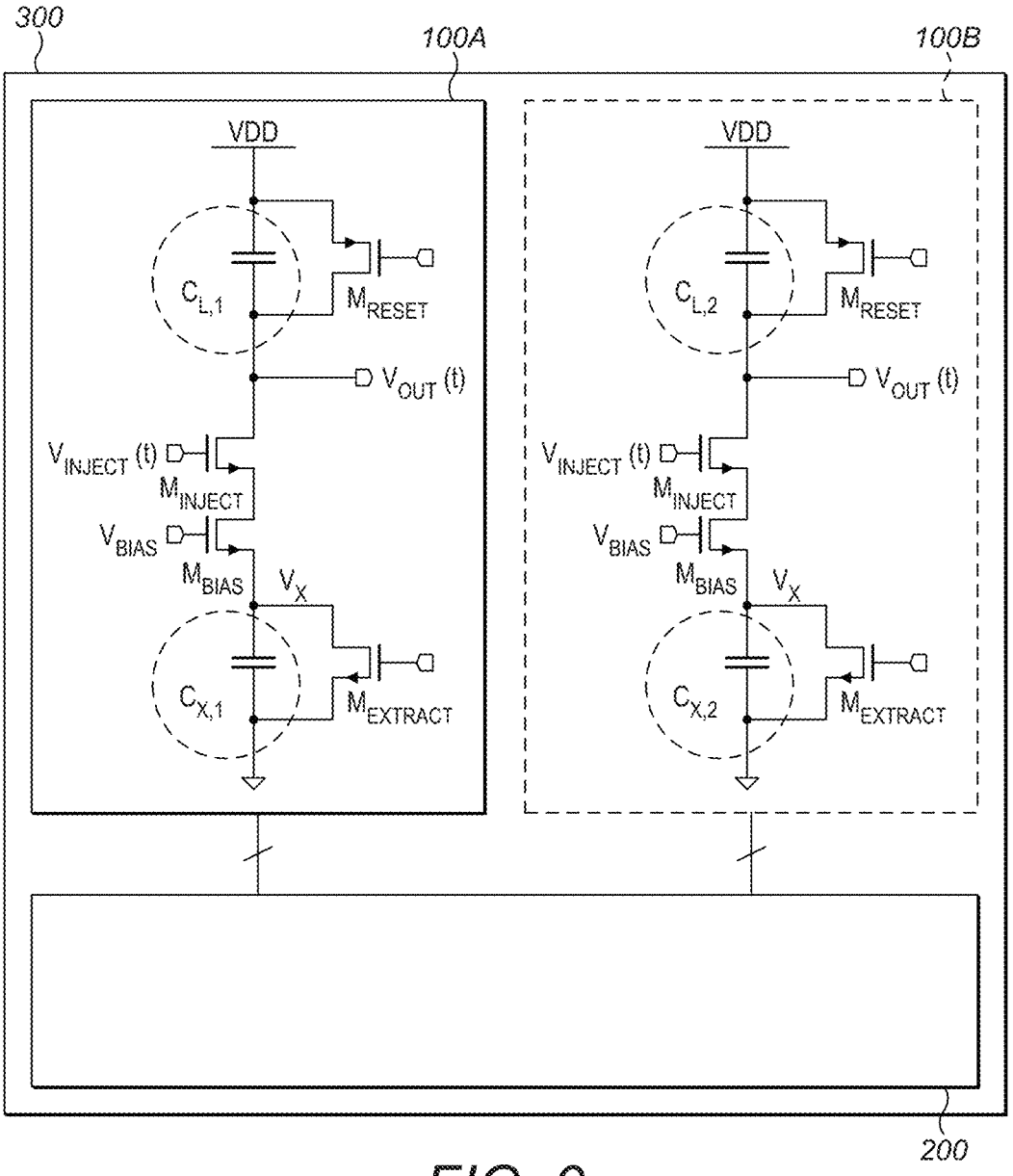
FIG. 9 shows a schematic drawing of a temperature sensor comprising a controller, in accordance with embodiments of the present invention.

In embodiments of the present invention the temperature
sensor 300 comprises a controller 200 configured for execut-
ing process steps for controlling each temperature sensing
circuit 100. A schematic drawing of such a temperature
sensor is shown in FIG. 9. The controller 200 interfaces with the temperature sensing circuits 100A and 100B for controlling the transistor gates and for reading the output voltage. The controller is configured for:

Interrupting a conductive path between the first and the second capacitor. This may for example be achieved by controlling the gate of the bias transistor and/or, if present, by controlling the gate of the inject switch.

Controlling the first reset transistor for biasing the first capacitor to the first bias voltage and the second reset transistor for biasing the second capacitor to the second bias voltage. This can be achieved by controlling the gates of the first reset transistor and of the second reset transistor.

Closing the conductive path between the first and the second capacitor for distributing charges between the first and second capacitor after biasing the first and second capacitor. This may for example be achieved by controlling the gate of the bias transistor and/or, if present, by controlling the gate of the inject switch.

Reading a voltage from the voltage readout node. The temperature sensor may, therefore, comprise an AD converter connected with the at least one voltage readout node for digitizing the output voltage and connected with a controller for passing the digitized result.

In embodiments of the present invention the controller is configured for converting the digitized output voltage in a temperature using a conversion scheme. In embodiments of the present invention the conversion scheme is a linear conversion. In embodiments of the present invention the controller for converting the digitized output voltage may be the same as the controller for executing the process steps.

In embodiments of the present invention the obtained temperature is the temperature of the junction of the bias transistor.

The controller may for example be a microcontroller, a microprocessor, a field programmable gate array, or any other controller known by a person skilled in the art.

In embodiments of the present invention the first predefined voltage may be determined by the charge which is applied to the first capacitor. For example a zero charge may be applied to the first capacitor.

In embodiments of the present invention the voltage readout node may be at the second capacitor ($V_x$) or at the first capacitor ($V_{out}$). The voltage may be measured with respect to a fixed voltage (e.g. VDD or ground) or the voltage at the first capacitor may be measured with respect to the voltage at the second capacitor (Vout−Vx).

In embodiments of the present invention the temperature sensor may comprise a voltage regulator for obtaining a predefined voltage for biasing the bias transistor 140.

Figure 10:
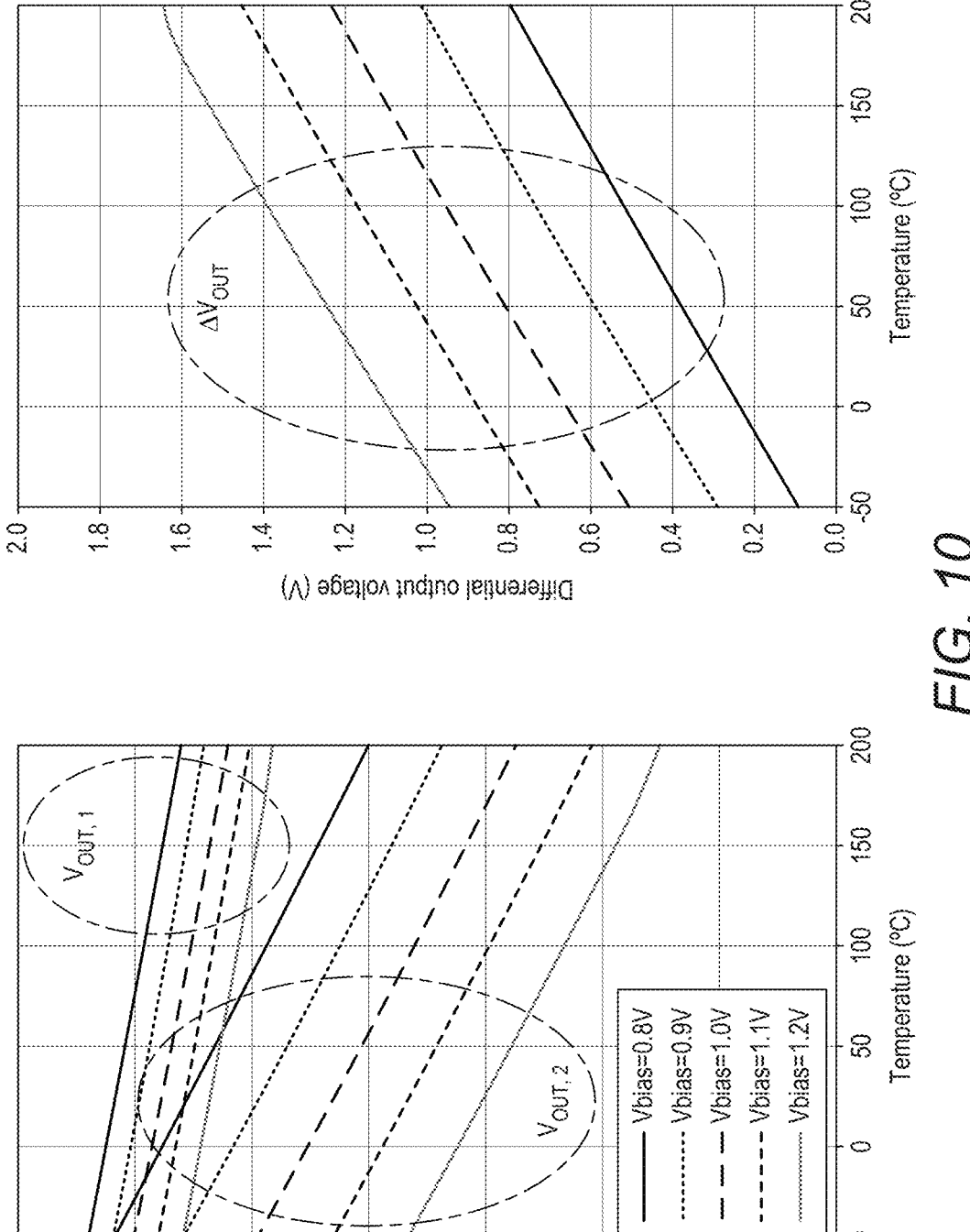
FIG. 10 illustrates the impact of the bias voltage on the output voltage in a temperature sensor according to embodiments of the present invention.

In embodiments of the present invention the temperature sensor may comprise a voltage reference circuit for obtaining a predefined voltage for biasing the bias transistor 140. In embodiments of the present invention this may be a bandgap voltage reference circuit. As illustrated in FIG. 10 the bias voltage $V_{BIAS}$ has a significant impact on the output voltage versus temperature characteristic. Increasing the bias voltage $V_{BIAS}$ shifts down the Vout(T) characteristic and shifts up the Vx(T) characteristic. The amount of shift induced depends on the capacitance ratio ($C_X/C_L$). In the right graph of FIG. 10 is illustrated that this shift is not compensated differentially. An error of about 15° C. is induced for every 20 mV of $V_{BIAS}$ variations.

A temperature sensor according to embodiments of the present invention may comprise a divider 170 for dividing a voltage at the first connecting node 111 for obtaining a predefined bias voltage for biasing the bias transistor 140. It is an advantage of embodiments of the present invention that the bias voltage is implemented as a fraction of the supply voltage VDD as this results in a better controlled voltage versus temperature characteristic. It is, moreover, advantageous that there is no need to use an external bandgap for generating the bias voltage. In embodiments of the present invention the bias voltage may for example be equal to the supply voltage divided by two ($V_{BIAS}$=VDD/2). The voltage divider may for example be a passive divider (e.g. a resistive divider) or an active divider (e.g. a MOSFET voltage divider).

Figure 11:
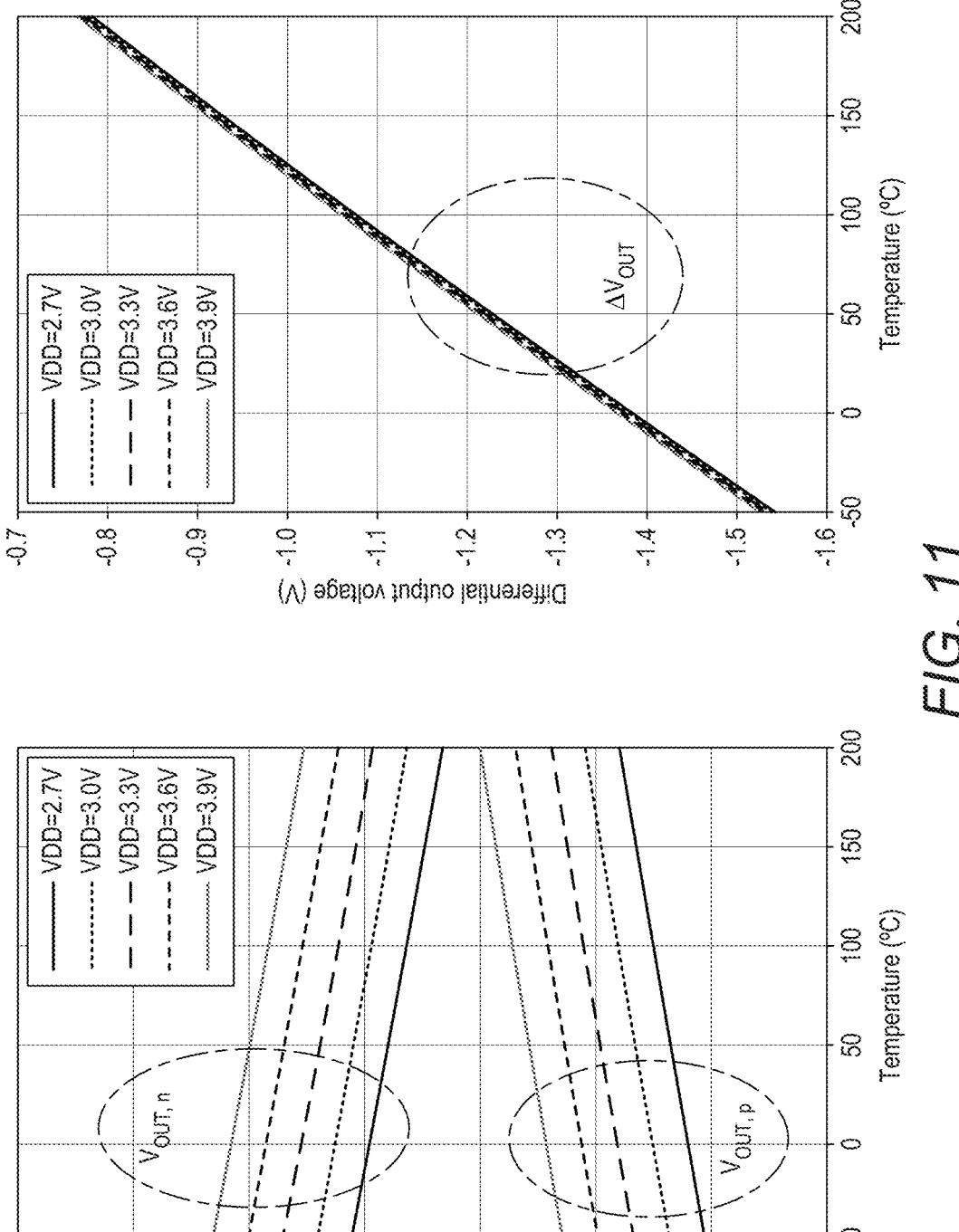
FIG. 11 shows output voltages of a temperature sensing circuit comprising an nMOS bias transistor and of a temperature sensing circuit comprising a pMOS bias transistor.

The left graph in FIG. 11 shows the sampled output voltage in function of temperature for measurements wherein the bias transistor 140 and the inject switch 130 of one of the temperature sensing circuits are n-channel metal-oxide-semiconductor transistors and the bias transistor 140 and the inject switch 130 of another of the temperature sensing circuits 100 are p-channel metal-oxide-semiconductor transistors. The different lines correspond with different supply voltages. The right graph shows the differential voltages between the output voltages of a temperature sensing circuit with nMOS bias transistor and of a temperature sensing circuit with pMOS bias transistor of the same supply voltage. It can be seen that, independent of the supply voltage, each differential voltage versus temperature characteristic is the same. In embodiments of the present invention the capacitance ratio of the nMOS and pMOS structure are chosen to compensate for their individual shift. The sizes of corresponding capacitors and transistors of both temperature sensing circuits may be selected substantially the same for a better matching. The capacitance of the first capacitor and of the second capacitor may for example range between 20 fF and 2000 fF, it may for example be equal to 200 fF. The width of a MOSFET transistor, WMOSFET may range between 0.1 μm and 10 μm, it may for example be equal to 1.050 μm. The length of a MOSFET transistor, LMOSFET may range between 0.1 μm and 10 μm, it may for example be equal to 0.990 μm.

Figure 12:
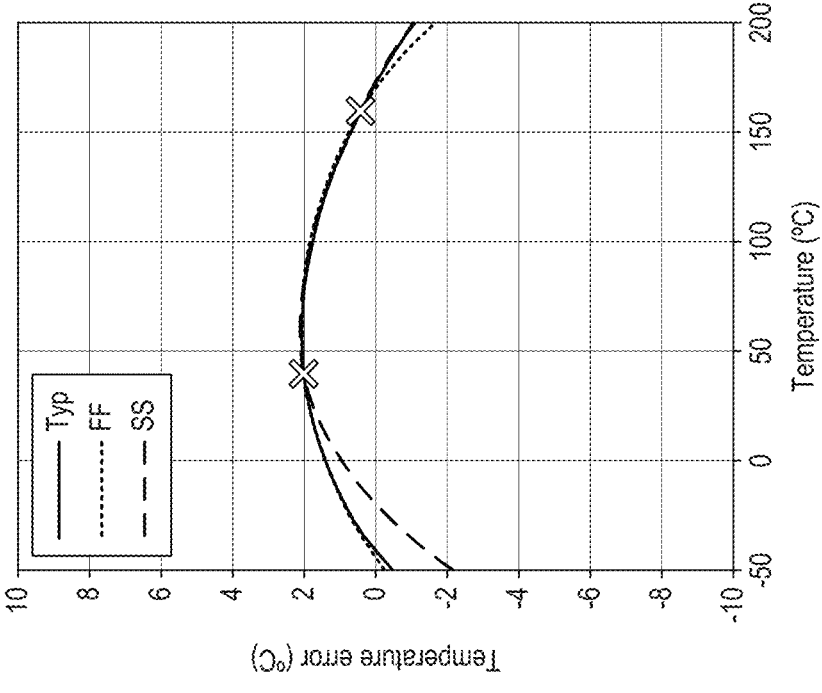
FIG. 12 illustrates one point and two point calibration of a temperature sensing circuit in accordance with embodiments of the present invention.
Figure 12:
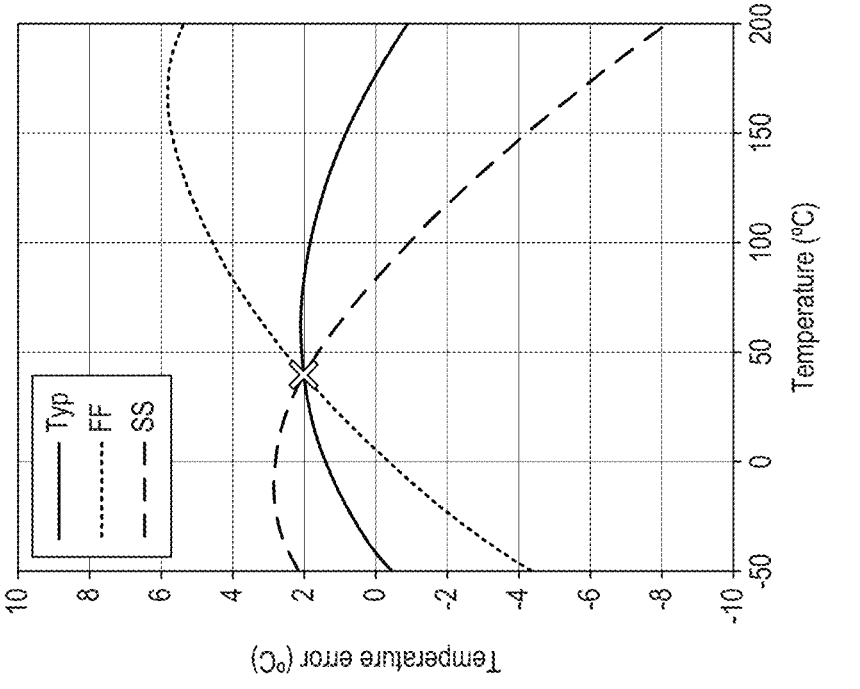

In embodiments of the present invention the controller 200 is configured for obtaining the conversion scheme using a one point calibration. It is an advantage of embodiments that a calibration at a single calibration point (a single temperature) is already sufficient for obtaining the conversion scheme. The left graph in FIG. 12 shows the temperature error in function of temperature for a temperature sensor according to embodiments of the present invention which is calibrated with a one-point calibration. The curves FF and SS are two corner conditions (i.e. conditions with extreme process parameters). Note that the error at the calibration point is artificially chosen to be different from zero, but a positive offset. In this case the idea was to minimize the error in the high-temperature range (−40° C. and +175° C.) by shifting the curve upwards. It could be an option to center the curve at the calibration temperature (i.e. zero error at the calibration temperature).

In embodiments of the present invention the controller 200 is configured for obtaining the conversion scheme using a two point calibration. It is an advantage of embodiments that with a calibration using a two point calibration (two different temperatures) the accuracy of the temperature sensor can be increased. This is illustrated in the right graph of FIG. 12. Using such a calibration an accuracy increase of 350% could be obtained.

Figure 13:
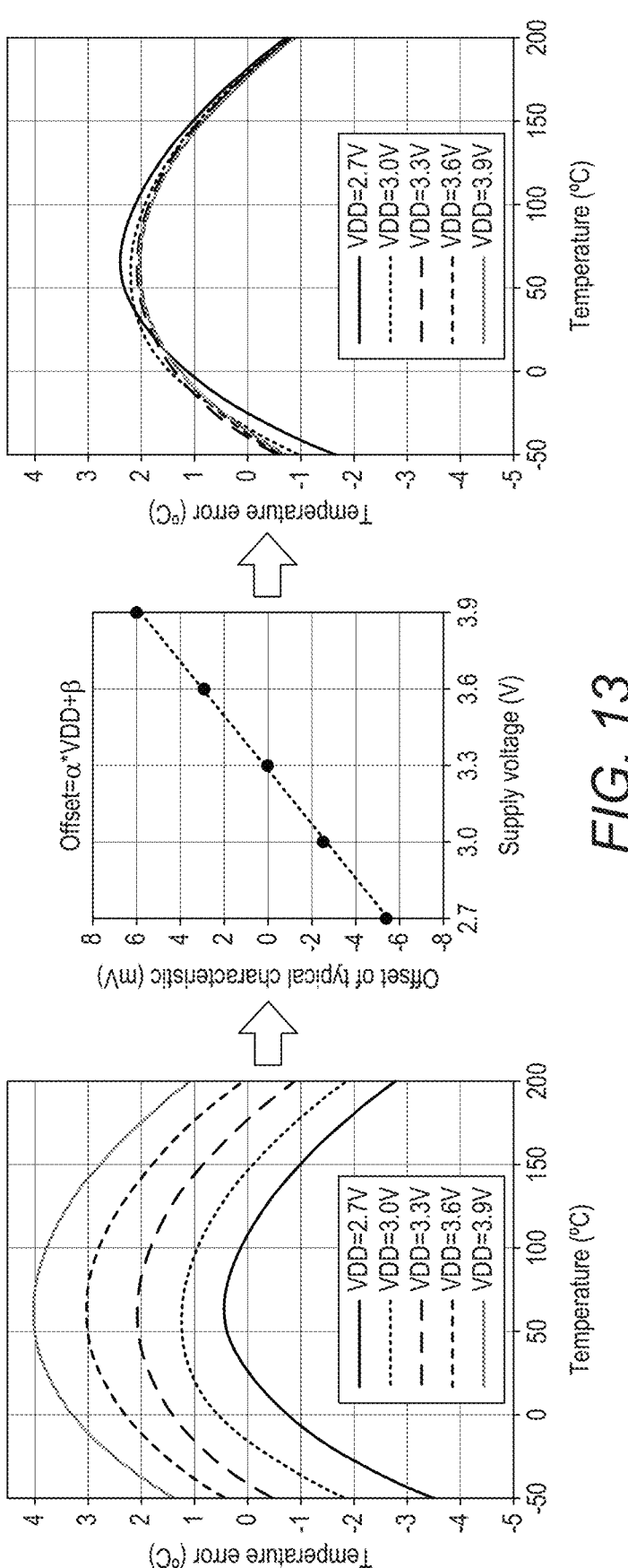
FIG. 13 illustrates a post-processing step for reducing a supply voltage dependent offset in the obtained temperature, in accordance with embodiments of the present invention.

In embodiments of the present invention the controller may be configured for additionally post-processing the obtained data for removing a supply voltage dependent offset. This is illustrated in FIG. 13. The left graph shows the temperature error in function of temperature after having done a two-point calibration, for different supply voltages. It can be seen that for different supply voltages a different offset is obtained. The middle graph shows the relationship between offset and the supply voltage. Knowing this relationship it is possible to correct the shift caused by the change in supply voltage. This is illustrated in the right graph of FIG. 13.

Figure 14:
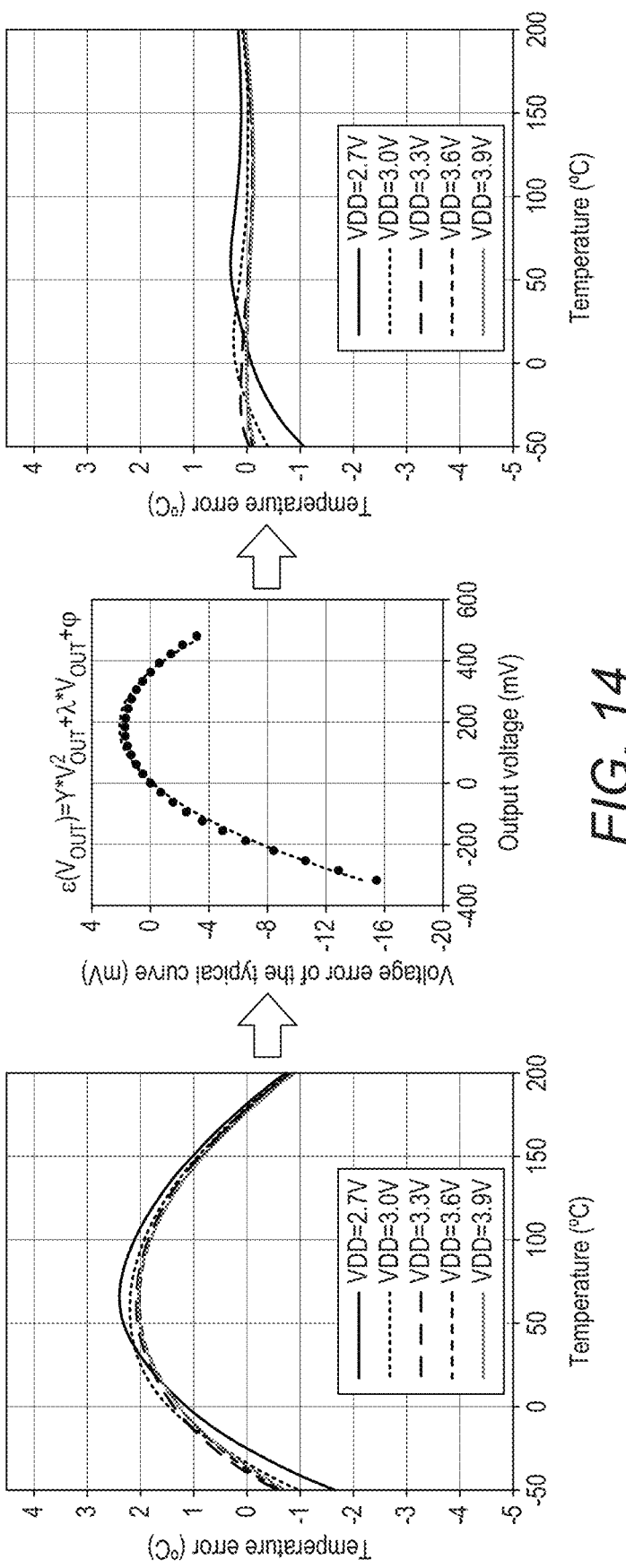
FIG. 14 illustrates a post-processing step for making the curvature of the characteristic with temperature constant, in accordance with embodiments of the present invention.

An additional post-processing step may be implemented in order to make the curvature of the characteristic with temperature constant (see FIG. 14). In the left graph a non-constant curvature with temperature is shown. The middle graph shows a voltage error curve as a function of the output voltage and the right graph shows the temperature error after the post-processing step for flattening the curvature in function of temperature by using the voltage error in function of output voltage.

Figure 15:
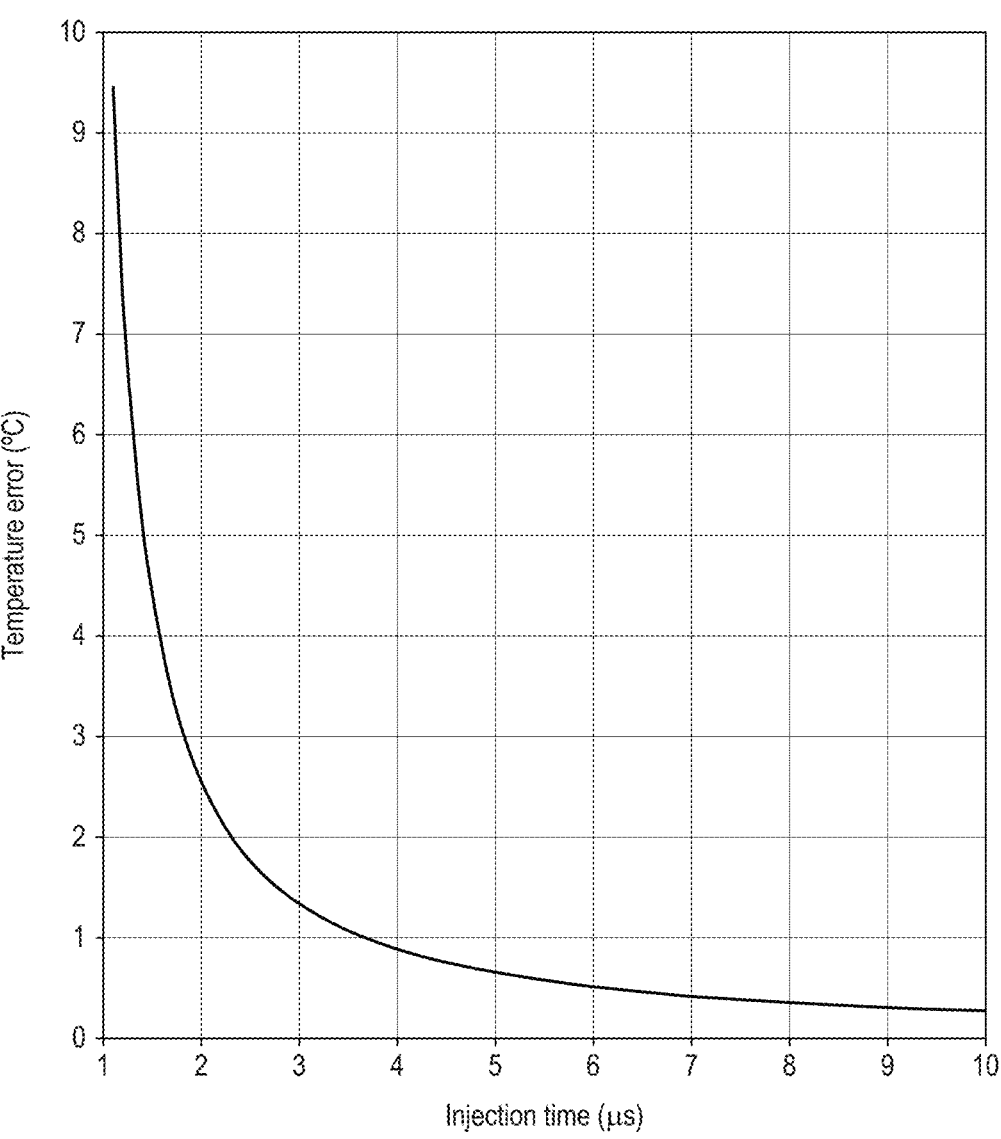
FIG. 15 shows the temperature error in function of injection time, in accordance with embodiments of the present invention.

In embodiments of the present invention the temperature error decreases with an increasing injection time. This is illustrated in FIG. 15 which shows the temperature error in function of the injection time. It assesses the impact of 100 ns of variation of the injection time on the extraction of temperature. From this graph it can be seen that a precise timing is not required. This allows to relax constraints on the time base (e.g. an oscillator).

A temperature sensor according to embodiments of the present invention may for example be used for functional safety by monitoring the operating temperature.

The surface of a temperature sensor according to embodiments of the present invention may for example be smaller than 5000 $\mu m^2$, or even smaller than 4000 $\mu m^2$.

The invention claimed is:

1. A temperature sensor for measuring a temperature, the temperature sensor comprising at least one temperature sensing circuit, characterized in that each temperature sensing circuit comprises a series connection of:
a first connecting node, connected with a first capacitor,
the first capacitor connected to a first reset transistor for biasing the first capacitor to a first bias voltage,
a bias transistor for distributing charges between the first and a second capacitor after biasing the first and the second capacitor,
the second capacitor connected to a second reset transistor for biasing the second capacitor to a second bias voltage, wherein the bias transistor is arranged between the first capacitor and the second capacitor,
a second connecting node, connected with the second capacitor, wherein the first connecting node and the second connecting node are configured for applying a supply voltage between the first and second connecting node,
each temperature sensing circuit comprising at least one voltage readout node between the first capacitor and the second capacitor for outputting a voltage that is a temperature measurement.

2. The temperature sensor according to claim 1, the temperature sensor comprising two temperature sensing circuits wherein a ratio of a capacitance of the first capacitor and a capacitance of the second capacitor is different for the two sensing circuits and/or wherein the bias transistor of one of the temperature sensing circuits is a n-channel metal-oxide-semiconductor transistor and the bias transistor of another of the temperature sensing circuits is a p-channel metal-oxide-semiconductor transistor.

3. The temperature sensor according to claim 1, the temperature sensor comprising a voltage reference circuit for obtaining a predefined bias voltage for biasing the bias transistor.

4. The temperature sensor according to claim 1, the temperature sensor comprising a divider for dividing a voltage at the first connecting node for obtaining a predefined bias voltage for biasing the bias transistor.

5. The temperature sensor according to claim 1, wherein each temperature sensing circuit comprises an inject switch between the first capacitor and the bias transistor or between the bias transistor and the second capacitor, wherein the inject switch can be opened for distributing the charges, or closed when biasing the first or second capacitor.

6. The temperature sensor according to claim 1, wherein the first reset transistor of each temperature sensing circuit is a p-channel metal-oxide-semiconductor transistor.

7. The temperature sensor according to claim 1, wherein the second reset transistor of each temperature sensing circuit is a n-channel metal-oxide-semiconductor transistor.

8. The temperature sensor according to claim 1, wherein the bias transistor of each temperature sensing circuit is a n-channel metal-oxide-semiconductor transistor.

9. The temperature sensor according to claim 1, wherein the bias transistor of each temperature sensing circuit is a p-channel metal-oxide-semiconductor transistor.

10. The temperature sensor according to claim 1, the temperature sensor comprising a controller configured for executing process steps for controlling each temperature sensing circuit the process steps comprising:
interrupting a conductive path between the first and the second capacitor,
controlling the first reset transistor for biasing the first capacitor to the first bias voltage and the second reset transistor for biasing the second capacitor to the second bias voltage,
closing the conductive path between the first and the second capacitor for distributing charges between the first and second capacitor after biasing the first and second capacitor,
reading a voltage from the voltage readout node.

11. The temperature sensor according to claim 1, the temperature sensor comprising an analog to digital converter for digitizing the obtained output voltage and a controller configured for converting the digitized output voltage in a temperature using a conversion scheme.

12. The temperature sensor according to claim 11, wherein the controller is configured for obtaining the conversion scheme using a one point calibration.

13. The temperature sensor according to claim 11, wherein the controller is configured for obtaining the conversion scheme using a two point calibration.

14. The temperature sensor according to claim 1 wherein the capacitance of the first capacitor and of the second capacitor is ranging 20 fF and 2000 fF.

15. The method for controlling a temperature sensor according to claim 1, the method comprising:
interrupting a conductive path between the first and the second capacitor,
controlling the first reset transistor for biasing the first capacitor to the first bias voltage and the second reset transistor for biasing the second capacitor to the second bias voltage, closing the conductive path between the first and the second capacitor for distributing charges between the first and second capacitor after biasing the first and second capacitor reading a voltage from the voltage readout node.

* * * * *